Figures 1, 2:
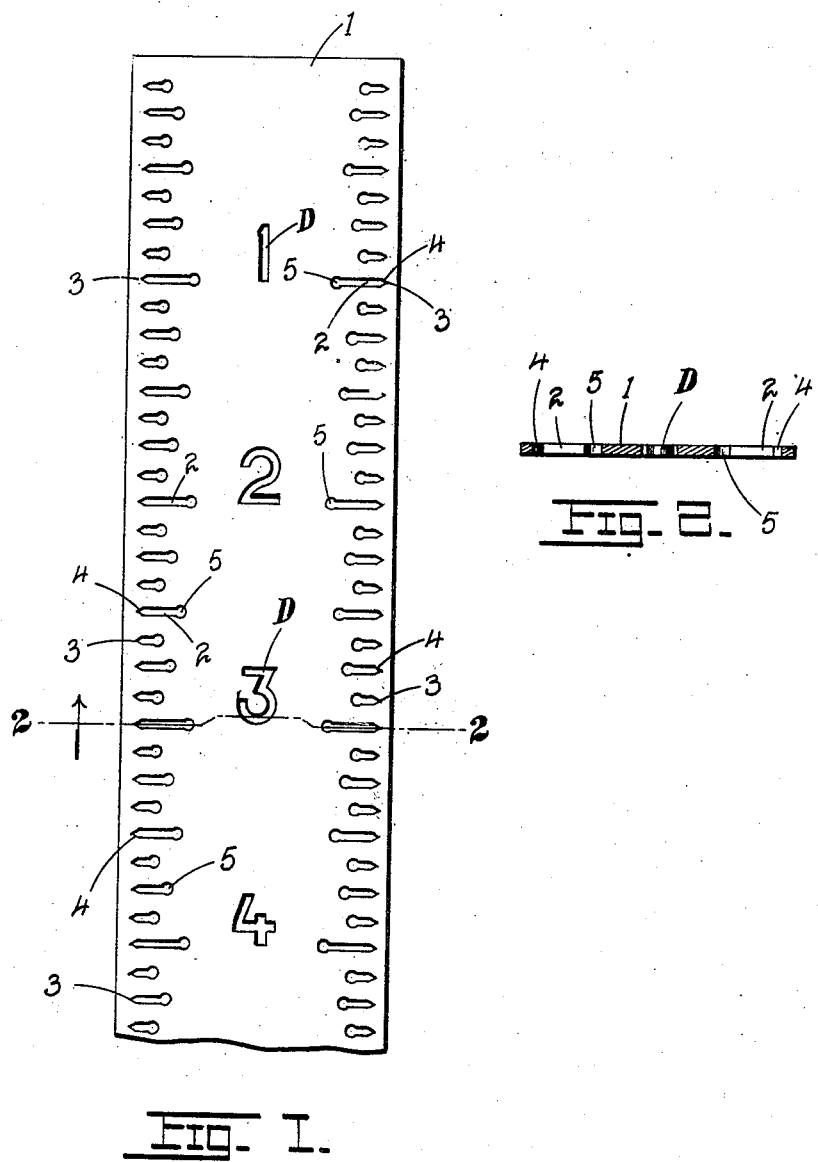

No. 861,799. PATENTED JULY 30, 1907.
R. BREIL.
MEASURING RULE.
APPLICATION FILED JAN. 12, 1906.

WITNESSES:

INVENTOR.
Robert Breil
BY
ATTORNEY.

UNITED STATES PATENT OFFICE.

ROBERT BREIL, OF ST. LOUIS, MISSOURI.

MEASURING-RULE.

No. 861,799.   Specification of Letters Patent.   Patented July 30, 1907.

Application filed January 12, 1906. Serial No. 295,690.

*To all whom it may concern:*

Be it known that I, ROBERT BREIL, a citizen of the United States, residing at St. Louis, in the State of Missouri, have invented certain new and useful Improvements in Measuring-Rules, of which the following is a specification.

My invention relates to improvements in measuring rules; and its objects are, first, to provide a cheap, practical and durable measuring device, available for all ordinary uses; second, to construct a measuring rule that will so display the article upon which it is used, that the measurement may be registered or checked directly upon the article being measured, by marking upon it through properly shaped openings or perforations, formed in the rule at intervals of space correctly graduated thereon for the purpose; and, third, to construct a measuring rule especially designed to as accurately and readily measure and work upon iron, or other metals while the same are in a state of red or glowing heat as when in their ordinary, or normal color and condition.

To enable others skilled in the art to which my invention appertains, to make and use the same, I will now proceed to describe its construction and operation, reference being had to the accompanying drawings, which form a part of this specification, and in which:—

In the drawings, Figure 1 is a plan of a portion of a conventional inch rule; and Fig. 2 is a transverse section on the line 2—2 of Fig. 1.

Referring to the drawings, 1 represents the body of the rule preferably made of steel or iron so as to be specially applicable for use in connection with articles forged in a blacksmith shop or foundry where occasion frequently arises to take measurements on red hot surfaces. The main or inch divisions are indicated by numerals D disposed along the longitudinal center of the rule the figures representing said divisions being punched entirely through the body as shown. The supplemental divisions of each main division comprise a series of slits or elongated openings 2 of suitable width, the position of the central line or axis of each slit being indicated by the vertex 3 of the sides 4 constituting the outer bevel end of each slit, that is to say the end contiguous to the edge of the rule. The opposite end of the slit terminates preferably in an enlargement or depression 5 having curved walls, these depressions allowing the free insertion therethrough of a pointed instrument about which the rule may be swung as a pivot, with the point of such instrument bearing against the surface of the article on which the measurements are marked off or from which they are taken. Each edge of the rule is provided with the slits 2. As shown by the drawings, the figures D marking the main divisions of the rule are disposed transversely to the body of the rule so that they can be read and recognized at a glance, (as the rule is laid or held at right angles to the observer) by the eye following the row of figures up and down without the necessity of twisting the neck or turning the head as must be apparent from an inspection of Fig. 1. The apex or vertex 3 being disposed on the central line of each slit corresponding to a given subdivision, enables the workman to accurately mark off a line on a red hot or glowing surface, by applying a marking tool or edge opposite said vertex as is obvious. The main figures D, and the slits corresponding to the subdivisions being punched entirely through the body of the rule, enables the workman to tell at a glance where to make his mark, especially when operating on red hot surfaces. As shown, the slits 2 are disposed at right angles to the edges of the rule.

Having described my invention what I claim is:

A metallic scale-rule having a series of main divisions identified by corresponding figures punched through the body of the rule opposite said main divisions, and disposed so as to read transversely across the rule, and a series of marginal subdivisions identified by slits disposed contiguous to and at right angles to the edges of the rule, the ends of the slits nearest the edges of the rule terminating in bevel ends identifying the medial lines of the slits, and terminating at the opposite ends in enlarged depressions, substantially as set forth.

In testimony whereof I affix my signature in presence of two witnesses.

ROBERT BREIL.

Witnesses:
 CHASE MORSEY,
 JESSE W. BARRETT.